UNITED STATES PATENT OFFICE.

WILLIAM HENRY WIGGINS, OF BROOKLYN, NEW YORK.

SUBSTITUTE FOR BILLIARD-CUE CHALK.

SPECIFICATION forming part of Letters Patent No. 329,349, dated October 27, 1885.

Application filed April 1, 1885. Serial No. 160,954. (No specimens.)

*To all whom it may concern:*

Be it known that I, WILLIAM H. WIGGINS, a citizen of the United States, and a resident of Brooklyn, in the county of Kings and State of New York, have invented a new and useful Improvement in Substitutes for Billiard-Cue Chalk, of which the following is a specification.

The ordinary cubical blocks of chalk used for rubbing on the leather tips of billiard-cues to prevent them from slipping or glancing off when struck against the surface of a billiard-ball are imported from Europe, where they are made by cutting or sawing them out from large pieces of solid chalk deposits as found in nature.

It is well known to billiard-players that the chalk generally only imperfectly serves its purpose for billiard cues, and is used only for want of something better. I have discovered and ascertained by experiments that baryta in some form, specially the mineral known as "barytes," owing to the greater sharpness and grittiness of its granules, even in the finest form, is far superior to chalk in the qualities required for the present purpose, and is less expensive, as the powder thereof can be molded into blocks without losing its effectiveness by mixing it with a slightly-adhesive substance in liquid form sufficient to cause the granules to stick together and the block to retain its shape when dry. For this purpose I mix the powdered barytes with a solution of dextrine in water, and shape the mixture in molds, as before stated, pressing out the moisture and drying the block. In order to increase the cohesiveness and hardness of the block, and make it last longer without impairing its effectiveness, I add in the mixture, while making it, as aforesaid, a small quantity—say two per cent.—of gypsum. This is an important addition, as the gypsum (although in itself unfit as a substitute for chalk) in "setting" contracts and hardens the mass, so that when applying the block to the leather tip of the cue it will not readily yield in excess, and renders less adhesiveness of the liquid necessary.

I wish it understood that the molding of powdered substances in blocks is old and not of my invention.

Having thus described my invention, I claim as new and desire to secure by Letters Patent—

1. As a substitute for billiard-cue chalk, a preparation of finely-granular barytes made coherent by mixing it with an adhesive liquid, substantially as and for the purpose set forth.

2. As a substitute for billiard-cue chalk, a preparation formed of finely-granular barytes mixed with liquid dextrine and a small percentage of gypsum, and molded into blocks, substantially as and for the purpose set forth.

In testimony that I claim the foregoing as my invention I have signed my name, in presence of two witnesses, this 25th day of March, 1885.

WILLIAM HENRY WIGGINS.

Witnesses:
A. W. ALMQVIST,
C. V. HELJESTRAND.